No. 767,063. PATENTED AUG. 9, 1904.
J. C. KELLER.
WATER TRAP.
APPLICATION FILED DEC. 26, 1903.
NO MODEL.
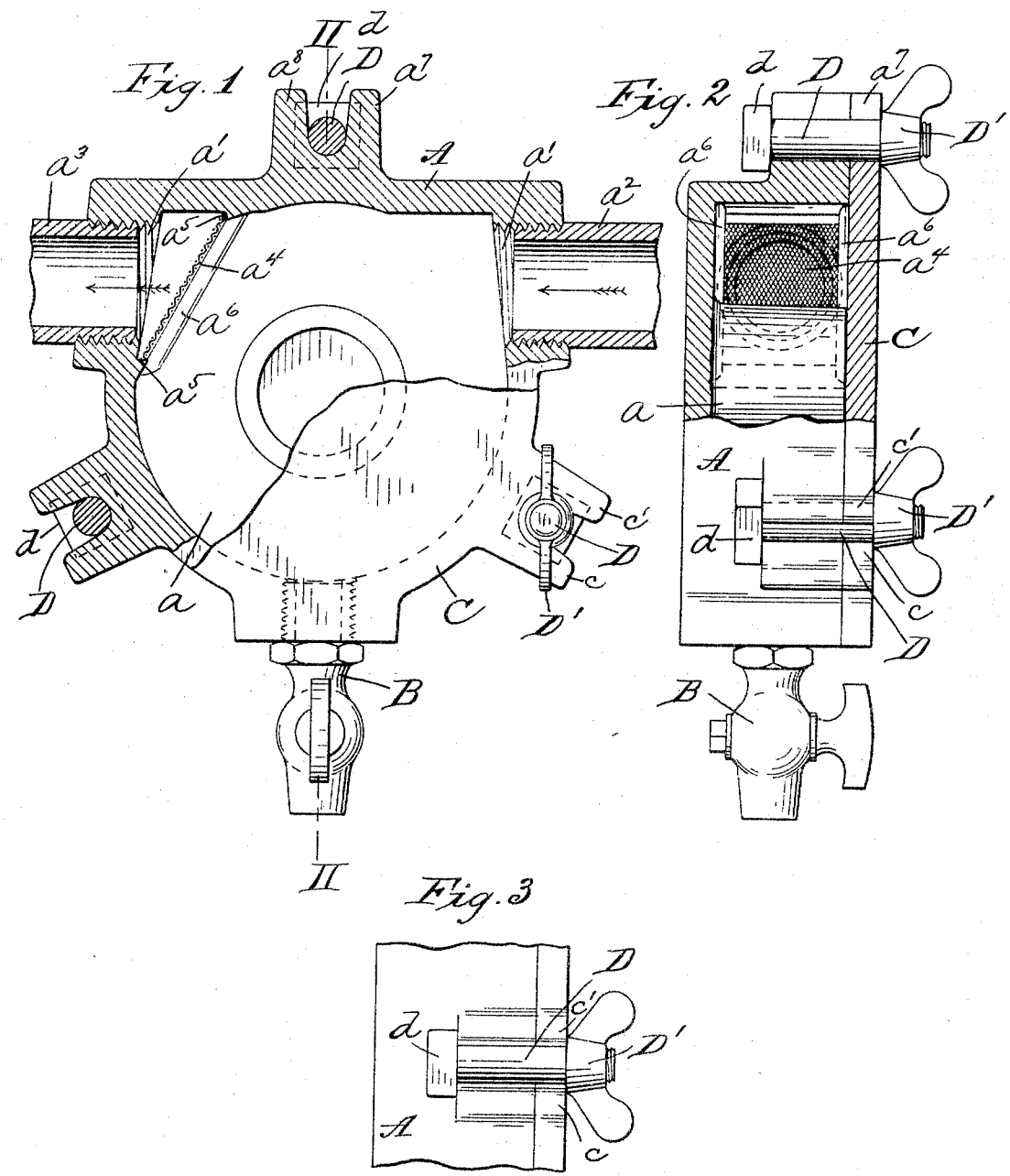

No. 767,063.  Patented August 9, 1904.

UNITED STATES PATENT OFFICE.

JAMES C. KELLER, OF CLEVELAND, OHIO, ASSIGNOR OF TWO-THIRDS TO CHRISTIAN GIRL AND OTTO F. KADOW, OF CLEVELAND, OHIO.

WATER-TRAP.

SPECIFICATION forming part of Letters Patent No. 767,063, dated August 9, 1904.

Application filed December 26, 1903. Serial No. 186,583. (No model.)

*To all whom it may concern:*

Be it known that I, JAMES C. KELLER, a citizen of the United States, residing at Cleveland, in the county of Cuyahoga and State of Ohio, have invented a certain new and useful Improvement in Water-Traps, of which the following is a full, clear, and exact description, reference being had to the accompanying drawings.

The invention relates to improvements in water-traps; and it consists in the employment of a casing having within the same a substantially annular recess, which is connected with and forms a part of a direct water-passage also in the casing. A screen is provided in connection with such direct water-passage to collect any foreign matter which may be present in the incoming water and direct it into the annular recess, the object of this arrangement of passages being to form a dead-water space in the annular passage, which permits the collection of foreign matter, as above mentioned.

While the water in the annular passage has no great amount of circulation, still there is sufficient movement caused by the flow of water through the direct passage to prevent stagnation and keep the water pure at all times. This circulation, however, does not stir up the sediment or in any way affect the efficiency of the device as a collector of all foreign matter which is present in the water.

The invention further contemplates the use of certain devices in connection with the trap whereby the sediment collected may be drawn off and also whereby access may be had to the interior of the casing for any purpose whatsoever.

The invention further consists in the construction and combination of parts hereinafter described, reference being had to the accompanying drawings, description, and claims.

Referring to the drawings, Figure 1 is a vertical sectional view, partly in elevation, showing the annular passage, the direct passage, and screen arranged in the latter. Fig. 2 is a view, partly in vertical transverse section, partly in elevation, of the trap looking from one edge of the casing upon line II II, Fig. 1; and Fig. 3 is a detail view of the parts located about the clamping-bolts.

In carrying out the invention any suitable form of casing may be used; but the casing A shown in the drawings is quite satisfactory for carrying out the invention. This casing is provided with a continuous annular passage $a$ and a direct passage $a'$, which is connected at one end to the inlet-pipe $a^2$ and at the other end to the outlet-pipe $a^3$. In the passage $a'$ and adjacent to the mouth of the pipe $a^3$ is a screen $a^4$, arranged to be supported in grooves $a^5$ in the casing and by an abutment $a^6$, provided in the annular passage along what might be termed substantially the "periphery" thereof.

The arrangement of the passages, as before stated, is such that the direct passage $a'$ forms a part of and is substantially tangential to the annular passage $a$, whereby as the water flows through the direct passage the annular passage will be entirely filled therefrom, but will not receive any great amount of circulation from the course of the water therethrough, the object being to form a dead-water space communicating with the direct passage for the collection of sediment deposited upon the screen.

Any suitable means, such as a petcock B, may be provided for drawing off the sediment from the annular recess or, in other words, the dead-water space.

Means are provided in connection with the device for obtaining access to the annular passage, and this means consists in a removable plate C upon one side of the casing A. This plate has ears $c\ c'$, three pairs being shown in the drawings, to be engaged by clamping-bolts D, which have heads $d$ engaging upon the under side of ears $a^7\ a^8$, provided on the casing A. Winged nuts D' are provided upon these bolts for holding the plate C tightly against the casing.

Having described my invention, I claim—

1. In a water-trap, the combination with a casing having an annular passage therein and a direct water-passage also in said casing and communicating with the annular passage whereby said direct passage will supply the water to said annular passage and form a dead-water space therein, of means in said direct passage for collecting the sediment from the water and depositing it in said annular passage.

2. In a water-trap, the combination with a casing having an annular recess therein and a direct water-passage arranged substantially tangential thereto and communicating therewith, of means for collecting the sediment from the water in said direct passage and depositing it in said annular passage.

3. In a water-trap, the combination with a casing having an annular recess and a direct water-passage which is substantially tangential to said annular recess, of a screen arranged in said direct passage for collecting the sediment from the water passing therethrough and depositing it in said annular recess.

4. In a water-trap, the combination with a casing having an annular recess and a direct water-passage which is substantially tangential to said annular recess, of a screen arranged in said direct passage for collecting the sediment from the water passing therethrough and depositing it in said annular recess, and a cock provided in communication with said annular recess for drawing off the sediment therefrom.

5. In a water-trap, the combination with a casing having an annular recess wholly within the same and a direct water-passage also lying wholly within said casing and forming a part of said annular recess and communicating therewith, of a screen removably secured in said direct passage and arranged to collect the sediment from the water passing therethrough and deposit it in said annular recess, and a plate removably secured to said casing whereby access may be had to the interior thereof.

6. In a water-trap, in combination with a substantially circular casing having suitable bosses which provide for an internal opening or passage which is substantially tangential to said casing, and also having an annular internal opening wholly within said casing and directly communicating with said passage, cleats upon the inner walls of said passage adjacent to one end thereof, a screen held by said cleats, a cover-plate arranged to extend over said annular opening and over said passage, and means for securing the same to said casing.

7. In a water-trap, the combination of a casing having an annular recess therein, and a direct water-passage forming a part of the same and communicating therewith, of cleats provided on the inner side of the walls of said passage near one end, a screen held in place by said cleats, and arranged to collect the sediment from the water passing therethrough and deposit it in the annular passage, a plate arranged to cover said annular passage and said direct passage, ears provided upon said plate, ears provided upon said casing, bolts arranged to extend between the ears upon the casing and the corresponding ears upon the plate whereby the same may be readily removed.

In testimony whereof I hereunto affix my signature in the presence of two witnesses.

JAMES C. KELLER.

Witnesses:
   W. J. DANTE,
   W. P. COATES.